United States Patent [19]

Tate et al.

[11] 3,975,282

[45] Aug. 17, 1976

[54] COMPOSITION AND METHOD FOR TREATING SCALE

[75] Inventors: Jack F. Tate; Russell D. Shupe; Jim Maddox, Jr., all of Houston, Tex.

[73] Assignee: Texaco Inc., New York, N.Y.

[22] Filed: Dec. 20, 1974

[21] Appl. No.: 534,959

[52] U.S. Cl. .......................... 252/180; 252/8.55 B; 252/181; 252/554; 260/513 R; 260/513 B
[51] Int. Cl.² ...................... C02B 5/00; C11D 1/12
[58] Field of Search ............... 252/8.55 B, 180, 181, 252/551; 260/513 R, 513 B

[56] References Cited
UNITED STATES PATENTS
2,535,678   12/1950   Hollander et al. ............... 260/513 R Primary Examiner—Mayer Weinblatt
Assistant Examiner—Edith R. Buffalow
Attorney, Agent, or Firm—T. H. Whaley; C. G. Ries; James F. Young

[57] ABSTRACT

Composition and method for the treatment of inorganic mineral scale particularly calcium and/or barium sulfate scale, using a treating composition consisting of a water-soluble sulfonated ethoxylated alcohol of prescribed formula in an amount of from about 0.0005% to about 0.005%, on a weight basis.

8 Claims, 1 Drawing Figure

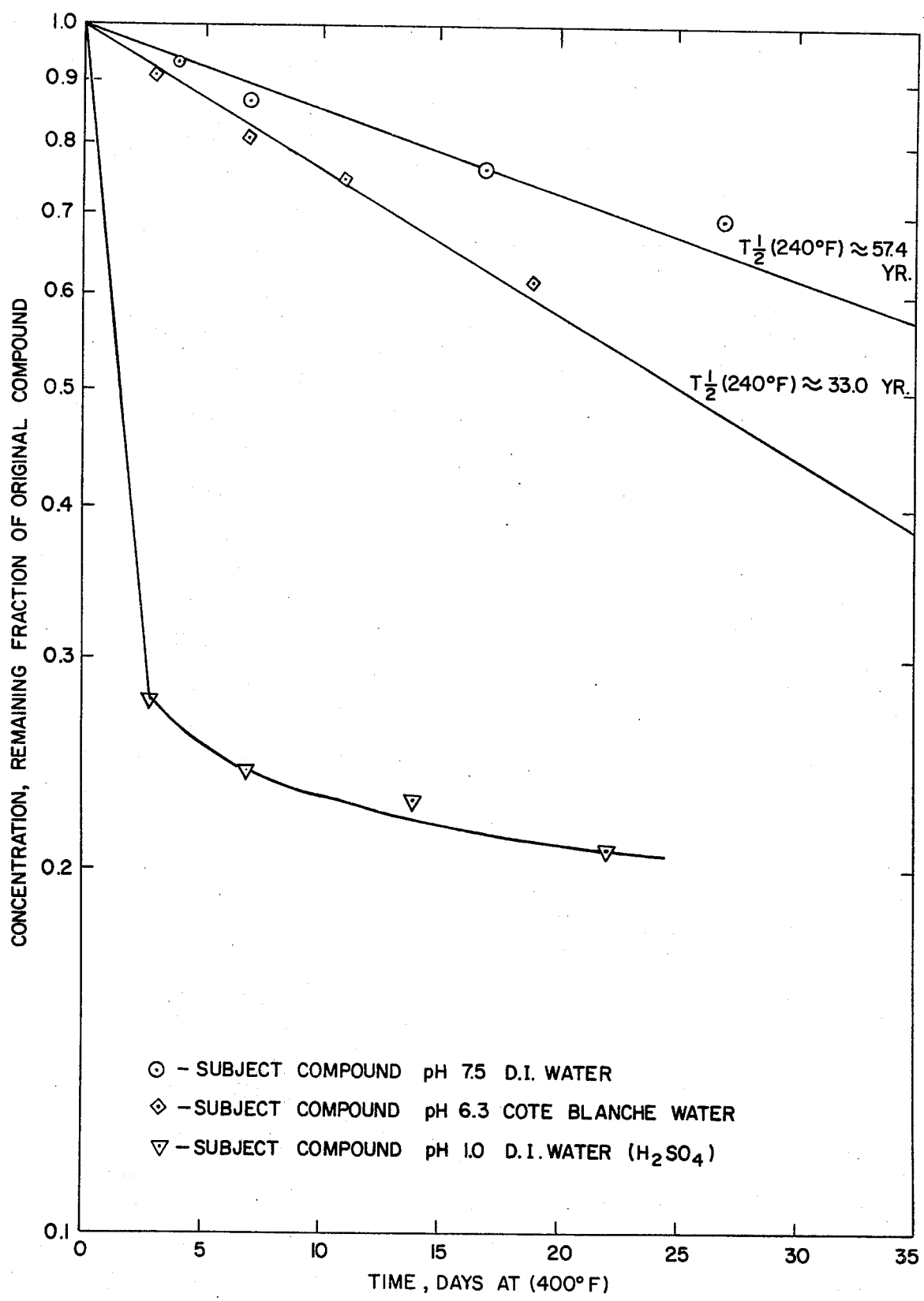

COMPOSITION AND METHOD FOR TREATING SCALE

This invention relates to a composition useful in treating oil and gas wells and to a method of using such composition for such treatment. More particularly this invention is directed to a composition and method useful in the prevention and/or inhibition of the buildup of undesirable inorganic mineral scale deposits in oil and gas wells, their flow lines, auxiliary producing equipment, such as heat exchangers and cooling towers, as well as the producing strata in the vicinity of the well bore. Additionally, the invention is useful in the prevention and/or inhibition of build-up of scale deposits in aqueous systems susceptible to mineral scale formation.

The formation of objectionable scale deposits, such as calcium and barium sulfate and calcium carbonate, or more broadly, the sparingly soluble alkaline earth metal sulfates and carbonates, hereinafter called "inorganic mineral scale", is rather widespread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams at the well bore may result in the deposition of crystalline calcium sulfate which gradually builds up on the walls of the well tubing, for example, to a point where it may choke off fluid flow in the tube if remedial measures were not undertaken.

Another cause of the scale formation is attributed to the precipitation of scale material from potentially supersaturated solutions thereof. When the operating variables of temperature and pressure change adversely, or solvent is allowed to evaporate, thus concentrating the solutions, precipitation of the salt on the tubing and surrounding strata occurs.

The use of strong alkali solutions for the removal of sulfate scale has been proposed. It has been claimed that under certain favorable conditions of temperature and time, concentrated alkali solutions will, in some cases, provide a break-up of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This precipitate may then be removed by suitable mechanical means. Such a method is obviously undesirable in that considerable periods of time are involved and the use of mechanical apparatus is expensive, and in some cases, either undesirable or mechanically impossible. Moreover, strong aqueous alkali is not effective in preventing or inhibiting the buildup of scale deposits in well tubing, production equipment and the producing strata about the bore hole.

It is, accordingly, an object of this invention to provide a method of inhibiting and/or preventing the buildup of inorganic mineral scale deposits in gas and oil flow lines, auxiliary equipment, well tubing and the surrounding subsurface strata.

A further object is to provide an inorganic mineral scale treating composition for use in preventing the build-up of scale deposits in the well tubing, producing equipment, the bore hole and surrounding strata.

A still further object of this invention is to provide a method of and composition for the treatment of gas and oil well tubing and the like containing inorganic mineral scale therein to prevent and/or inhibit the buildup of further scale deposits in the tubing.

These as well as other objects are accomplished according to the present invention which comprises a scale prevention and/or inhibition composition comprising a water-soluble sulfonated, ethoxylated alcohol having the following general formula $$R(OCH_2CH_2)_n SO_3^- A^+$$

wherein R is an aliphatic hydrocarbon group containing from about 8 to about 20 carbon atoms, $n$ is a number from 1 to 10, and $A^+$ is a monovalent cation selected from the group consisting of sodium, potassium and ammonium, including mixtures, which is employed in an amount of from about 0.0005% to about 0.005%, on a weight basis.

The invention also comprises a method of treating equipment susceptible to the development of inorganic mineral scale deposits therein such as heat exchangers and the like, particularly oil field equipment, using the scale prevention composition.

Representative examples of compounds useful in the practice of the invention include the sulfonated, ethoxylated octyl, decyl, dodecyl, tridecyl, tetradecyl, pentadecyl, hexadecyl, heptadecyl, octadecyl, nonadecyl, and eicosyl alcohols including the branched chain isomers thereof. The alcohol can be either a primary or secondary alcohol or a mixture of any of these alcohols.

The ethoxy portion of the alcohol can be, for example, di-, tri-, tetra-, penta-, hexa-, octa-, nona-, and deca.

A particularly preferred group are the $C_{12}$-$C_{18}$ primary alcohols containing from about 3 to 10 ethoxy groups therein, and especially the sodium and ammonium salts of these materials.

In carrying out one aspect of the present invention the method thereof comprises introducing the scale prevention composition into the equipment to be protected, such as oil well tubing, in the form of an aqueous solution in an amount sufficient to provide the aforesaid composition therein continuously in an amount of from about 0.005% to about 0.005%, preferably 0.001% to 0.003%, based on the weight of said composition, and maintaining the inorganic mineral scale treating composition in contact with the internal surfaces thereof to prevent and/or inhibit the development of scale deposits or additional scale deposits therein. It is desirable to circulate the scale prevention composition through the system continuously to provide adequate contact of the composition with the surfaces to be protected and to insure its presence in the potentially scaling water at all times. Underground strata surrounding the well bore can be treated in a like manner, i.e. by passing the solution into said strata such as by injection of the solution down through the bore hole or production tubing, preferably under pressure.

Use of the composition in an amount below about 0.0005% does not provide satisfactory scale inhibiting properties while the amounts above about 0.005% are unnecessary.

In addition, it has been found that excellent protection against continued deposition of objectionable inorganic mineral scale deposits can be obtained by maintaining the treating composition in contact with preexisting inorganic mineral scale continuously in a concentration of from about 0.0005% to about 0.005%.

A more complete understanding of the invention will be obtained from the following illustrative examples.

The following procedure was used in the evaluations.

A 600 milliliter glass beaker was provided with sufficient calcium sulfate and sodium chloride, obtained by mixing the solutions of calcium chloride and sodium sulfate and adding additional sodium chloride thereto to produce an aqueous concentration thereof of 10,000 ppm of calcium sulfate and 50,000 ppm of sodium chloride. A hollow metal rotor attached to an externally provided mechanical stirring device was immersed in the test solution for a 24 hour time period. The solution was gradually heated by means of an electric heater present inside the hollow rotor and was maintained at a temperature of 118°F. during the test period. At the end of the 24 hours, the rotor was removed from the solution and from the stirrer, the scale deposited thereon removed, dried and weighed. The above laboratory test procedure affords good correlation between the results thereby obtained and actual field performance of scale preventing compositions.

The following table records the results of the tests.

TABLE

| Example | Amount of Additive (ppm) (% × 10⁴) | | | |
|---|---|---|---|---|
| | 0 | 5 | 10 | 15 |
| | Weight of Scale Deposited (gm) | | | |
| 1 Additive A | 1.6 | 0.0 | 0.0 | 0.0 |
| 2 Additive B | 1.5 | 0.0 | 0.0 | 0.0 |
| 3 Additive C | 1.5 | 1.0 | 0.0 | — |
| 4 Additive D | 1.1 | 1.0 | 1.0 | 0.0 |

A - Sulfonated, pentaethoxylated mixed $C_{12}$-$C_{18}$ alcohols containing 40% dodecyl, 30% tetradecyl, 20% hexadecyl and about 10% octadecyl groups, sodium salt.
B - Sulfonated, triethoxylated mixed $C_{12}$-$C_{18}$ alcohols containing 40% dodecyl, 30% tetradecyl, 20% hexadecyl, and about 10% octadecl groups, sodium salt.
C - Sulfonated, triethoxylated mixed $C_{10}$-$C_{14}$ alcohols containing 80% decyl, 10% dodecyl and 10% tetradecyl groups, sodium salt.
D - Sulfonated, pentaethoxylated mixed $C_{10}$-$C_{14}$ alcohols containing 85% decyl, 9% dodecyl, and 6% tetradecyl groups, sodium salt.

Inspection of the data in the above table show that the aforesaid sulfonates of the present invention are effective scale inhibitors. It is to be observed that the compounds used in Examples 1 and 2 are effective over a very broad concentration range. Further that the compound in Example 3 is more effective at a concentration of at least about 0.001% (10 ppm) than at 0.0005% (5 ppm) whereas the compound used in Example 4 is effective at a concentration of 0.0015% (15 ppm).

It has been found that the scale prevention compositions of the present invention are especially effective in the presence of high calcium ion concentrations to 1% by weight or more, and particularly and somewhat uniquely in applications where high aqueous solution temperatures are encountered such as above 100°C. The compositions of the present invention are temperature stable and effective as scale inhibitors at temperatures up to about 150°C., e.g. 100°–150°C.

The unusual thermal stability of one of the species of the compositions of the present invention is graphically shown by the accompanying drawing.

In the drawing the graph is constructed on one cycle semi-logarithmic paper having 70 linear divisions along the abscissa.

These data were obtained using the compound Additive "D", identified in the above Table.

At normal operating pHs of 7.5 and 6.3 in deionized water and a representative field water, respectively, half lives at 116°C. (240°F.) are 57.4 and 33 years. The actual experiments were conducted at 400°F., and the half lives extrapolated to 240°F. It is seen therefore, that at pH 6.3 in field water at as high a temperature as 204.5°C. (400°F.), a half life of 25 days is attained.

Scale inhibitor compositions such as the admixture of sulfated/sulfonated polyethoxy $C_8$-$C_{14}$ alkylphenols and $C_8$-$C_{14}$ alkylbenzene sulfonates disclosed in copending, commonly assigned patent application Ser. No. 428,587 (D No. 73,764), filed December 26, 1973, are likely not effective at such temperatures, for the sulfated/sulfonated polyethoxy alkylphenol component decomposes at such temperatures, permitting the alkylbenzene sulfonate component thereof to precipitate at calcium ion levels above about 0.005% (50 ppm), thus destroying the system's effectiveness as a scale inhibitor.

The disclosed compounds may be prepared in the following manner:

The ethoxylated alcohol is reacted with thionyl chloride for about 18 hours at about 100°C., to form the monochloro derivative, followed by reaction of said monochloro derivative with sodium sulfite for about 18 hours at about 155°C., in a 1/1 by volume admixture of water and ethanol in a Paar Bomb. The resulting recovered sulfonated product, on analysis, showed about 75% sulfonation of the terminal ethoxy group.

This method of preparation is exemplary only, but was the method employed to prepare some of the tested compositions. Those skilled in the art may perceive other synthetic schemes.

For example, the sulfonated ethoxylated alcohols of the present invention can be prepared from sulfated ethoxylated alcohols by treatment with sodium sulfite at 200°C. for about 10–12 hours, resulting in relatively high yields (75–80%) of the desired sulfonate. The (sulfate) starting material, can be prepared by reaction of an ethoxylated aliphatic alcohol, including mixtures thereof with such reagents as sulfuric acid of chlorosulfonic acid to obtain the sulfated ethoxylated alcohol.

The compounds used in Examples 1 and 2 in the Table above were prepared by reacting a commercially available mixed $C_{12}$-$C_{18}$ alcohols (Conoco-Alfol 1218) with ethylene oxide to adduct ratios thereto of 5 and 3 ethoxy groups respectively. The resulting respective ethoxylated alcohols were then sulfonated as described above. In a similar manner, the compounds of Examples 3 and 4 were prepared using commercially available mixed $C_{10}$-$C_{14}$ alcohols, (Conoco Alfols 1014 and 1012).

Obviously, other modifications and variations of the invention as hereinbefore set forth may be made without departing from the spirit and scope thereof and therefore only such limitations should be imposed as are indicated in the appended claims.

We claim:

1. Method of controlling the buildup of inorganic mineral scale selected from the group consisting of calcium sulfate, barium sulfate and calcium carbonate in an aqueous system which comprises incorporating into said system a scale-treating composition consisting essentially of an aqueous solution of a watersoluble sulfonated, ethoxylated compound having the general formula $$R(OCH_2CH_2)_nSO_3^-A^+$$

wherein R is a hydrocarbon group containing from about 8 to about 20 carbon atoms, n is a number from one to about ten, including fractions, and $A^+$ is a monovalent cation selected from the group consisting of sodium, potassium, and ammonium, including mixtures, in a concentration effective to control said inorganic mineral scale build-up, and being selected in the range of from about 0.0005% to about 0.005% on a weight basis.

2. Method as claimed in claim 1, wherein said compound is the sodium salt of a sulfonated pentaethoxylated dodecyl alcohol.

3. Method as claimed in claim 1, wherein said compound is the sodium salt of a sulfonated hexaethoxylated hexadecyl alcohol.

4. Method as claimed in claim 1, wherein said compound is the sodium salt of a sulfonated heptaethoxylated pentadecyl alcohol.

5. Method as claimed in claim 1, wherein said compound is the sodium salt of a sulfonated pentaethoxylated mixed $C_{12}$-$C_{18}$ alcohol.

6. Method as claimed in claim 1, wherein said compound is the sodium salt of a sulfonated, pentaethoxylated mixed $C_{12}$-$C_{18}$ alcohol containing from about 35 to 45% $C_{12}$ alkyl, 25 to 35% $C_{14}$ alkyl, 15 25% $C_{16}$ alkyl and 5 to 15% $C_{18}$ alkyl groups.

7. Method as claimed in claim 1 wherein said compound is the sodium salt of a sulfonated, pentaethoxylated octadecyl alcohol.

8. Method as claimed in claim 1, wherein said compound is the sodium salt of a sulfonated triethoxylated tetradecyl alcohol.

* * * * *

UNITED STATES PATENT AND TRADEMARK OFFICE
CERTIFICATE OF CORRECTION

PATENT NO. : 3,975,282

DATED : August 17, 1976

INVENTOR(S) : Jack F. Tate; Russell D. Shupe & Jim Maddox, Jr.

It is certified that error appears in the above-identified patent and that said Letters Patent are hereby corrected as shown below:

Column 2, line 50, delete "0.005%" (first occurrence) and insert --0.0005% --

Col. 4, line 46, delete "of" and insert -- or --.

Col. 6, line 12 delete "15 25%" and insert -- 15 to 25% --

Signed and Sealed this

Seventeenth Day of October 1978

[SEAL]

Attest:

RUTH C. MASON
Attesting Officer

DONALD W. BANNER
Commissioner of Patents and Trademarks